United States Patent [19]
Berge et al.

[11] Patent Number: 4,458,027
[45] Date of Patent: Jul. 3, 1984

[54] OLEFIN POLYMERIZATION CATALYSTS

[75] Inventors: Charles T. Berge; Mark P. Mack, both of Ponco City, Okla.

[73] Assignee: E. I. Du Pont de Nemours and Company, Wilmington, Del.

[21] Appl. No.: 476,897

[22] Filed: Mar. 18, 1983

[51] Int. Cl.³ .......................... C08F 4/64; C08F 4/68; C08F 4/62
[52] U.S. Cl. .................................. 502/104; 502/113; 502/116; 502/117; 502/119; 502/125; 502/126; 526/128
[58] Field of Search ............... 502/104, 117, 119, 125, 502/116, 113, 126

[56] References Cited

U.S. PATENT DOCUMENTS

| 4,159,965 | 7/1979 | Sakurai et al. | 502/116 |
| 4,220,745 | 9/1980 | Tanaka et al. | 502/105 X |
| 4,255,280 | 3/1981 | Sakurai et al. | 502/116 |
| 4,335,016 | 6/1982 | Dombro | 502/125 X |
| 4,395,360 | 7/1983 | Albizatti et al. | 502/116 X |
| 4,412,049 | 10/1983 | Shiga et al. | 502/116 X |

FOREIGN PATENT DOCUMENTS 57-51846  11/1982  Japan .

Primary Examiner—Patrick Garvin
Attorney, Agent, or Firm—Cortlan R. Schupbach

[57] ABSTRACT

Reaction products of organic magnesium compounds and silyl esters and/or poly (silyl esters) are contacted with transition metal compounds to yield active polymerization catalysts. In a preferred embodiment, the active polymerization catalyst is further activated by contacting with a halogenating agent soluble in a hydrocarbon solvent.

15 Claims, No Drawings

OLEFIN POLYMERIZATION CATALYSTS

This invention relates to the manufacture of olefin polymerization catalysts. More specifically, this invention relates to olefin polymerization catalysts obtained from the reaction product of a silyl ester and an organomagnesium compound, a poly[oxy(silylene) ester] and an organo-magnesium compound, or a mixture of these, which is contacted with a transition metal compound to yield the active polymerization catalyst.

Silyl esters are generally known in the art. These materials are useful as coupling agents for glass fibers, cross-linking silicone rubber compositions, sequestering agents for hard water materials, water repellent for hydrophyllic materials, and in certain forms are useful for the retardation of water evaporation. Representative but non-exhaustive examples of the prior art representing such materials include Chem Abstracts 81:90751b and U.S. Pat. No. 3,974,189, which show the production of acyloxy silane compositions by reacting a chlorosilane with a carboxylic acid or carboxylic acid and anhydride in the presence of an iron complexing agent. U.S. Pat. No. 2,573,302 shows the production of methyl silyl acetates by reacting chlorosilane with anhydrous salt of acetic acid at room temperature. Canadian Pat. No. 488,531 shows the production of such materials by reacting organic carboxylic salts with organo silicon halides.

Poly[oxy(silylene) esters], also called poly(silyl esters) in this specification, are novel materials useful in the practice of the present invention. These materials can be prepared utilizing carboxylic acid salts with silicon reagents in the presence of phase transfer catalysts as described in our copending application Ser. No. 383,389, filed June 1, 1982, now Pat. No. 4,412,065.

Much of the current interest in alpha-olefin polymerization catalysts requires that such catalysts be sufficient versatile to produce a wide variety of polymeric resins by simple manipulation of the polymerization conditions. It is also greatly desirable that simple modification of the catalyst system result in a wide variety of resin physical properties. It would be yet more ideal if such modifications provided synergistic results.

Currently, work in the area of catalyst modifications has been directed toward using various co-catalysts or in changing the method of catalyst preparation. Both modifications appear to be limited in scope and generally an improvement in one area results in a loss in another, as, for example, in the case where broad molecular weight distribution is achieved only by sacrificing catalyst activity.

It would therefore be of great benefit to provide a catalyst having high activity while providing sufficient catalyst system modification to improve particular properties in the resin or even in the catalyst itself.

It is therefore an object of the present invention to provide a highly active catalyst capable of altering resin properties. Other objects will become apparent to those skilled in this art as the description proceeds.

We have now discovered that these objectives can be met using olefin polymerization catalysts comprising the reaction product of silyl esters and/or poly[oxy(silylene) esters] with organomagnesium compounds, followed by contact with a transition metal compound.

Many references exist dealing with methods of preparing catalysts containing silicon, magnesium, and transition metal compounds. Representative but non-exhaustive examples of such references is U.S. Pat. No. 4,239,650 which teaches a process for the manufacture of a mixed catalyst comprising reacting complex metal alcoholates with transition metal compounds in acid halides. However, this reference deals with alkylates and not the silyl esters of the present invention.

U.S. Pat. No. 4,220,725 relates to the use of alkoxy containing silyl esters in the preparation of polymerization catalysts containing titanium and a magnesium compound. This reference, however, requires that the catalysts must contain silicon-alkoxy bonding and magnesium dihalide. In addition, these catalysts are prepared using a process of grinding which is capital intensive and requires lengthy preparation time.

The catalysts of the present invention provide resins of excellent quality and provide versatility in selecting desired resin properties. The catalysts are novel in structure and have a very high activity.

These catalysts are prepared by a process comprising
(a) reacting silyl esters of the general formula

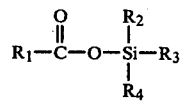

and/or poly[oxy(silylene) esters] of the general formula

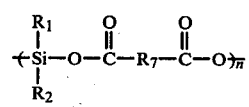

with magnesium compounds of the general formula

and (b) contacting the reaction product of (a) with Group IVb to VIII transition metal compounds soluble in a hydrocarbon solvent, wherein $R_1$, $R_2$, $R_3$, $R_4$, $R_5$ and $R_6$, are, independently, hydrogen, halide, alkyl and alkoxy groups containing from 1 to 30 carbon atoms, aryl, aryloxy, cycloalkyl and cycloalkoxy groups containing from 6 to 30 carbon atoms, $R_7$ is an alkyl group containing from 1 to 30 carbon atoms, a cycloalkyl group, alkaryl group, aralkyl group, aryl group or bicycloalkyl group containing from 6 to 30 carbon atoms and n is greater than 2.

Representative but non-exhaustive examples of magnesium compounds suitable for use in the process of the present invention are

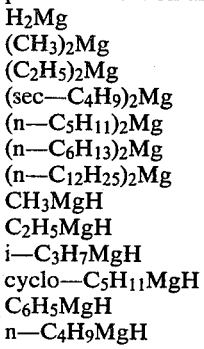

(n—C4H9)Mg(C2H5)
(n—C4H9)Mg(sec—C4H9)
(n—C4H9)2Mg.(C2H5)3Al
(n—C4H9)2Mg.0.13 (C2H5)3Al
(CH3CH2CH2)2Mg.(C2H5)2O
(n—C6H13)2Mg.0.02 (C2H5)3Al
(n—C6H13)2Mg.0.05 (C2H5)2O
(n—C6H13)2Mg.0.05 Al(O—i—C3H7)3
(n—C4H9)Mg(C2H5).0.05 (C2h5)2O
(n—C4H9)Mg(C2H5).0.05 Al(O—i—C3H7)3

In addition, a halogenating agent can be added to this mixture to further improve and activate the catalyst. Of the halogenating agents, chlorinating agents are preferred. Suitable chlorinating agents are compounds of chlorine with a metal, organic group or hydrogen. The material used to halogenate the catalyst should preferably be a liquid, a gas, or soluble in a saturated aliphatic hydrocarbon solvent. Representative but non-exhaustive examples of such halogenating are methylaluminum dichloride, methylaluminum sesquichloride, isobutylaluminum dichloride, isobutylaluminum sesquichloride, ethylaluminum dichloride, diethylaluminum chloride, ethylaluminum sesquichloride, tin tetrachloride, silicon tetrachloride, hydrogen chloride, trichlorosilane, aluminum chloride, ethylboron dichloride, boron chloride, diethylboron chloride, chloroform, phosphorus trichloride, phosphorus oxychloride, acetyl chloride, thionyl chloride, sulfur chloride, methyl trichlorosilane, dimethyl dichlorosilane, titanium tetrachloride, vanadium tetrachloride, zirconium tetrachloride and vanadium trichloride.

It is, of course, realized that the other halogens will be effective, although chlorine is preferred.

In the preparation of the catalyst it is preferred that the reaction product of the silyl ester and the organomagnesium compound be soluble in saturated aliphatic hydrocarbon solvent at temperatures of from about −10° C. to about 100° C. Preferred temperatures for use of these reaction products range from about 0° C. and about 40° C.

Representative but non-exhaustive examples of suitable saturated aliphatic hydrocarbon solvents in which the reaction product of the silyl ester in the organomagnesium compound is soluble are n-pentane, n-octane, n-hexane, cyclo-heptane, cyclo-hexane, methyl cyclo-hexane, iso-octane, neopentane and the isomers cogenors and mixtures of these.

Any transition metal of the group 4b to 8, in the periodic chart as set forth in the CRC Handbook of Chemistry and Physics, 58b Edition, 1977, which is suitable for polymerization reaction can be used in the preparation of catalysts utilizing the process of the present invention. Representative but non-exhaustive examples of suitable transition metal compounds are $TiCl_4$, $TiCl_3(-OBu)$, $TiCl_2(-OBu)_2$, $TiCl(-OBu)_3$, $Ti(-OBu)_4$, $Ti[OSi(CH_3)_3]_4$, $[(CH_3)_3SiO]_2TiCl_2$, $[(CH_3)_3SiO]TiCl_3$, $(CH_3H_7O)_3Ti[OSi(OC_3H_7)_3]$, $[(CH_3)_3SiO]_2Ti(O-i-C_3H_7)_2$, $VCl_5$, $VOCl_3$, $CrCl_2$, $TiCl_2(cyclopentadiene)_2$, $Zr(OBu)_4$ and $Zr(-CH_2-C(CH_3)_2\phi)_4$, $Zr(-CH_2\phi)_4$.

In the finished catalyst obtained from the process of the present invention, molar ratios of silicon to magnesium can range from about 0.1:1.0 to about 10:1.0, respectively. The preferred molar ratio is about 1.0:1.0.

The molar ratio of magnesium to titanium in the catalyst of the present invention can range from about 0.1:1.0, respectively, to about 500.0:1.0, respectively. The preferred mole ratio range of magnesium to titanium ranges from about 0.5:1.0 to 25:1.0, respectively.

The molar ratio of chlorine to magnesium in the catalyst of the present invention can range from about 1.0:1.0 to about 500:1.0. The preferred mole ratio range of chlorine to magnesium is from about 1.0:1.0 to about 10.0:1.0, respectively.

When preparing the catalyst of the present invention, an inert atmosphere of nitrogen, argon or any other gas nonreactive toward the reagents can be used. It is critical that the gas contain essentially no oxygen or water (oxygen and water must be maintained below levels sufficient to impede the reaction).

The catalysts, when prepared, are then used for polymerization of olefins with the addition of a co-catalyst as is well known in the art.

The instant invention is more concretely described with reference to the examples below wherein all parts and percentages are by weight unless otherwise specified. The examples are provided to illustrate the present invention and not to limit it.

EXAMPLE 1

Trimethylsilylacetate (6.44 grams) was added to dihexylmagnesium (9.8 weight percent in heptane, 3.35 millimoles magnesium) which was diluted with 15 milliliters (ml) of oxygen-free dry hexane. The reaction took place at room temperature with vigorous stirring. The resulting yellow solution was stirred for 30 minutes to ensure complete reaction. Tetra-n-butyl titanate (0.23 grams) was added at room temperature to produce a yellow-orange solution. After stirring for one hour, ethylaluminum dichloride was added (25 weight percent n-heptane, 6.1 ml) over a period of approximately 3 hours. During the addition, a precipitate was formed. After settling the precipitate, the liquid layer was removed and replaced with about 30 ml hexane. This wash step was repeated three times. The resulting tan-colored precipitate was used as a polymerization catalyst.

EXAMPLE 2

All polymerizations were conducted at 120 pounds per square inch gauge (psig) ethylene pressure for 60 minutes while polymerizations were carried out in 600 ml of hexane. The co-catalyst used in all cases was 0.8 ml of 25 weight percent triethylaluminum in heptane. The data collected using the catalyst prepared in Example 1 of polymerization reactions is set forth in Table 1.

TABLE 1

| | | | |
|---|---|---|---|
| Temperature (°C.) | 85° C. | 85° C. | 70° C. |
| $H_2$ (psig) | 45–50 | 20 | 20 |
| Catalyst activity (gPE/gTi.h) | 834.00 | 1,166,000 | 1,126,000 |
| *$MI_2$, (g/10 min) | 1.0 | 0.14 | 0.02 |
| *$MI_{10}$, (g/10 min) | 9.2 | 1.5 | 0.29 |
| *$MI_{20}$, (g/10 min) | 34 | 5.6 | 1.3 |
| Density (g/ml) | 0.9627 | 0.9564 | 0.9520 |

In the table $MI_2$ was determined as described in ASTM 1238. Density was determined by forming resin plaques as described in ASTM method D1928. Plaque density was then determined using ASTM method 1505. The symbol* denotes an average of two separate determinations carried out on identical resin samples.

EXAMPLE 3

Trimethylsilylacetate (6.44 grams) was added to dihexyl magnesium (9.8 weight percent in heptane, 3.5 mmoles magnesium) which was diluted with 15 ml of oxygen-free dry hexane. Reaction was carried out at room temperature with vigorous stirring. A yellow solution resulted which was stirred for 30 minutes to ensure complete reaction. Tetra-n-butyl titanate (0.0456 grams) was added at room temperature to produce a yellow-orange solution. After stirring for ½ hour, ethylaluminum dichloride was added (25 weight percent in heptane, 4.86 ml) over approximately 1.5 hours. The resulting tan-colored precipitate was used for the polymerization of ethylene. The results of these polymerizations are set forth in Table 2.

EXAMPLE 4

Dimethyl-t-butylsilylbenzoate (0.875 grams) was added to dihexyl magnesium (9.8 wt % in heptane, 3.7 mmoles Mg). The reaction was carried out at room temperature and produced a yellow solution. Tetra-n-butyl titanate (0.25 grams) was added to form a dark orange solution. With vigorous stirring, 15 ml of $EtAlCl_2$ (25 wt % in heptane) was added over 3 minutes. A brown precipitate formed and was used to catalyze the polymerization of ethylene. Polymerization results are set forth in Table 2.

EXAMPLE 5

Trimethylsilylacetate (6.44 grams) was added to dihexyl magnesium (9.8 wt % in heptane, 3.35 mmoles Mg) which was diluted with 15 ml of oxygen-free, dry hexane. The reaction took place at room temperature with vigorous stirring. The resulting yellow solution was stirred for 30 minutes to ensure complete reaction. Titanium tetrachloride (0.077 grams) was added (quickly) at room temperature to produce a black viscous solution. After stirring for 16 hours, $EtAlCl_2$ was added (25 wt % in heptane, 5.0 ml) over approximately two minutes. A precipitate was formed during the addition. The resulting brown colored precipitate was used for the polymerization of ethylene. Data on catalyst activity and resin properties are reported in Table 2.

TABLE 2

| Catalyst | Example 3 | Example 4 | Example 5 |
| --- | --- | --- | --- |
| Temperature (°C.) | 85° C. | 85° C. | 85° C. |
| $H_2$(psig) | 46 | 45 | 46 |
| Catalyst Activity (gPE/gTi.h) | 1,700,000 | 849,000 | 986,000 |
| $MI_2$, (g/10 min) | 6.1 | *6.7 | 6.3 |
| $MI_{10}$, (g/10 min) | 51 | *68 | 55 |
| $MI_{20}$, (g/10 min) | 189 | *250 | 197 |
| Density (g/ml) | 0.9647 | 0.9662 | 0.9656 |

In Table 2 the properties were determined using the same procedures as set forth for Table 1. The symbol* denotes an average of two separate determinations carried out on identical resin samples.

While certain embodiments and details have been shown for the purpose of illustrating this invention, it will be apparent to those skilled in this art that various changes and modifications may be made herein without departing from the spirit or scope of the invention.

We claim:

1. Olefin polymerization catalysts comprising the reaction product of
    (a) silyl esters of the general formula

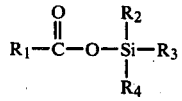   I.

and/or polysilyl esters of the general formula

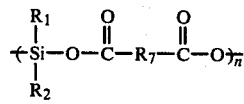   II.

with magnesium compounds of the general formula

   III and (b) contacting the reaction product of (a) with group IVb to VIII transition metal compounds, wherein $R_1$, $R_2$, $R_3$, $R_4$, $R_5$, and $R_6$, are, independently, hydrogen, halide, alkyl and alkoxy groups containing from 1 to 30 carbon atoms, aryl groups, aryloxy groups, cycloalkyl groups and cycloalkoxy groups containing from 6 to 30 carbon atoms, $R_7$ is an alkyl group containing from 1 to 30 carbon atoms, a cyclo-alkyl group, alkaryl group, aralkyl group, aryl group or bicycloalkyl group containing from 6 to 30 carbon atoms and n is greater than 2.

2. A catalyst as described in claim 1 wherein the reaction product of (b) is contacted with a halogenating agent.

3. A catalyst as described in claim 2 wherein the halogenating agent is a chlorinating agent selected from the group consisting of methylaluminum dichloride, methylaluminum sesquichloride, isobutylaluminum dichloride, isobutylaluminum sesquichloride, ethylaluminum dichloride, diethylaluminum chloride, ethylaluminum sesquichloride, tin tetrachloride, silicon tetrachloride, hydrogen chloride, trichlorosilane, aluminum chloride, ethylboron dichloride, boron chloride, diethylboron chloride, chloroform, phosphorus trichloride, phosphorus oxychloride, acetyl chloride, thionyl chloride, sulfur chloride, methyl trichlorosilane, dimethyldichlorosilane, titanium tetrachloride, vanadium tetrachloride, zirconium tetrachloride and vanadium trichloride.

4. A method for the preparation of active polymerization catalysts comprising
    (a) reacting silyl esters of the general formula

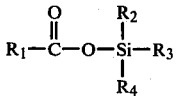   I.

and/or

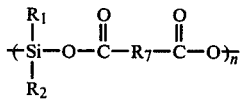   II.

with magnesium compounds of the general formula

   III and (b) contacting the reaction product of (a) with a Group IVb to VIII transition metal compound soluble in a hydrocarbon solvent, wherein $R_1$, $R_2$, $R_3$, $R_4$, $R_5$, and $R_6$, are, independently, hydrogen halide, alkyl, alkoxy, groups containing from 1 to 30 carbon atoms, aryl, aryloxy, cycloalkyl and cycloalkoxy groups containing from 6 to 30 carbon atoms, $R_7$ is an alkyl group containing from 1 to 30 carbon atoms, a cycloalkyl group, alkaryl group, aralkyl group, aryl group or bicycloalkyl group containing from 6 to 30 carbon atoms and n is greater than 2.

5. A method as described in claim 4 wherein the reaction product of (b) is contacted with a halogenating agent.

6. A method as described in claim 5 wherein the halogenating agent is a chlorinating agent selected from the group consisting of methylaluminum dichloride, methylaluminum sesquichloride, isobutylaluminum dichloride, isobutylaluminum sesquichloride, ethylaluminum dichloride, diethylaluminum chloride, ethylaluminum sesquichloride, tin tetrachloride, silicon tetrachloride, hydrogen chloride, trichlorosilane, aluminum chloride, ethylboron dichloride, boron chloride, diethylboron chloride, chloroform, phosphorus trichloride, phosphorus oxychloride, acetyl chloride, thionyl chloride, sulfur chloride, methyl trichlorosilane, dimethyldichlorosilane, titanium tetrachloride, vanadium tetrachloride, zirconium tetrachloride and vanadium trichloride.

7. A method as described in claim 5 wherein the reaction products of the silyl esters and organomagnesium compounds are soluble in saturated aliphatic hydrocarbon solvents.

8. A method as described in claim 7 wherein the saturated aliphatic hydrocarbon solvents are selected from the group consisting of n-pentane, n-octane, n-hexane, cycloheptane, cyclohexane, methyl cyclohexane, isooctane, neopentane and the isomers, cogenors and mixtures of these.

9. A method as described in claim 8 wherein transition metal compounds are selected from the group consisting of $TiCl_4$, $TiCl_3(-OBu)$, $TiCl_2(-OBu)_2$, $Ti(-OBu)_4$, $Ti[OSi(CH_3)_3]_4$, $[(CH_3)_3SiO]_2TiCl_2$, $[(CH_3)_3SiO]TiCl_3$, $(C_3H_7O)_3Ti[OSi(OC_3H_7)_3]$, $[(CH_3)_3SiO]_2Ti(O-i-C_3H_7)_2$, $VCl_5$, $VOCl_3$, $CrCl_2$, $TiCl_2-(cyclopentadiene)_2, Zr(OBu)_4$ and $Zr(-CH_2-C(CH_3)_2\phi)_4$, $Zr(-CH_2\phi)_4$.

10. A method as described in claim 9 wherein the halogenating agent is a compound of chloride with an organometallic group or hydrogen and which is soluble in hydrocarbon solvent.

11. A method as described in claim 10 wherein the halogenating agent is at least one material selected from the group consisting of methylaluminum dichloride, methylaluminum sesquichloride, isobutylaluminum dichloride, isobutylaluminum sesquichloride, ethylaluminum dichloride, diethylaluminum chloride, ethylaluminum sesquichloride, tin tetrachloride, silicon tetrachloride, hydrogen chloride, trichlorosilane, aluminum chloride, ethylboron dichloride, boron chloride, diethylboron chloride, chloroform, phosphorus trichloride, phosphorus oxychloride, acetyl chloride, thionyl chloride, sulfur chloride, methyl trichlorosilane, dimethyldichlorosilane, titanium tetrachloride, vanadium tetrachloride, zirconium tetrachloride and vanadium trichloride.

12. A method as described in claim 5 wherein the magnesium compound is selected from the group consisting of
$H_2Mg$
$(CH_3)_2Mg$
$(C_2H_5)_2Mg$
$(sec-C_4H_9)_2Mg$
$(n-C_5H_{11})_2Mg$
$(n-C_6H_{13})_2Mg$
$(n-C_{12}H_{25})_2Mg$
$CH_3MgH$
$C_2H_5MgH$
$i-C_3H_7MgH$
$cyclo-C_5H_{11}MgH$
$C_6H_5MgH$
$n-C_4H_9MgH$
$(n-C_4H_9)Mg(C_2H_5)$
$(n-C_4H_9)Mg(sec-C_4H_9)$
$(n-C_4H_9)_2Mg.(C_2H_5)_3Al$
$(n-C_4H_9)_2Mg.0.13\ (C_2H_5)_3Al$
$(CH_3CH_2CH_2)_2Mg.(C_2H_5)_2O$
$(n-C_6H_{13})_2Mg.0.02\ (C_2H_5)_3Al$
$(n-C_6H_{13})_2Mg.0.05\ (C_2H_5)_2O$
$(n-C_6H_{13})_2Mg.0.05\ Al(O-i-C_3H_7)_3$
$(n-C_4H_9)Mg(C_2H_5).0.05\ (C_2H_5)_2O$
$(n-C_4H_9)Mg(C_2H_5).0.05\ Al(O-i-C_3H_7)_3$.

13. A method as described in claim 12 wherein the molar ratio of silicon to magnesium ranges from about 0.1:1.0 to about 10:1.0, respectively.

14. A method as described in claim 13 wherein the molar ratio of magnesium to titanium ranges from about 0.1:1 to about 500:1, respectively.

15. A method as described in claim 14 wherein the molar ratio of halide to magnesium ranges from about 1:1 to about 100:1, respectively.

* * * * *